United States Patent
Kim et al.

(10) Patent No.: US 6,239,720 B1
(45) Date of Patent: May 29, 2001

(54) CIRCUIT AND METHOD FOR PROVIDING SIMULTANEOUS TRANSMISSION OF PAGE DATA IN A PAGING SYSTEM

(75) Inventors: Sung Hak Kim; Chang Ho Kim, both of Seoul (KR)

(73) Assignee: Samsung Electronics Co., LTD (KR)

( * ) Notice: Subject to any disclaimer, the term of this patent is extended or adjusted under 35 U.S.C. 154(b) by 0 days.

(21) Appl. No.: 09/046,916

(22) Filed: Mar. 24, 1998

(30) Foreign Application Priority Data

May 10, 1997 (KR) .................................................. 97-18063

(51) Int. Cl.$^7$ ....................................................... H04Q 1/00
(52) U.S. Cl. ...................... 340/825.44; 455/502; 455/503
(58) Field of Search ......................... 340/825.44, 825.46, 340/311.1, 825.69, 286.01; 370/313; 349/168; 445/31.1, 38.4; 455/426, 502, 503

(56) References Cited

U.S. PATENT DOCUMENTS

| | | | |
|---|---|---|---|
| 5,663,715 | * | 9/1997 | Godoroia ........................... 340/825.2 |
| 5,760,705 | * | 8/1998 | Glessner et al. ................. 340/825.44 |
| 6,011,977 | * | 1/2000 | Brown .................................. 455/503 |

* cited by examiner

Primary Examiner—Brian Zimmerman
(74) Attorney, Agent, or Firm—Dilworth & Barrese, LLP

(57) ABSTRACT

A circuit and method which provides the simultaneous transmission of page data in a paging system by delaying a reference clock signal from a global positioning system. The method for the simultaneous transmission of page data in a paging system comprises the steps of: inputting the reference clock signal from the Global Positioning System (GPS) receiver into a plurality of transmitter controllers of the paging system; delaying, by a value of 1–X seconds, the reference clock signal which is input into each of the transmitter controllers, the value of X being a delay time associated with the transmitter associated with each of the transmitter controllers; sending the page data from the plurality of transmitter controllers to each of the associated transmitters in accordance with the delayed clock signal; and transmitting the page data from the plurality of transmitters simultaneously, whereby the simultaneous transmission of page data is synchronized with the reference clock signal from the GPS receiver, notwithstanding the delay time associated with each of the transmitters.

8 Claims, 5 Drawing Sheets

CIRCUIT AND METHOD FOR PROVIDING SIMULTANEOUS TRANSMISSION OF PAGE DATA IN A PAGING SYSTEM

BACKGROUND OF THE INVENTION

1. Field of the Invention

The present invention relates to a circuit and method for transmitting page data in a paging system and, more specifically, to a circuit and method for delaying a reference clock signal from a receiver of the Global Positioning System in order to provide the simultaneous transmission of page data in a paging system.

2. Description of the Related Art

A conventional paging system offers various wireless call services to each pager in the system. The paging system includes a plurality of base sites which offer the call service to a cell (i.e., an assigned area). Each base site receives call data from a paging terminal and sends an on-air call signal to the pager in the applicable area. Each base site should simultaneously send paging data so as to prevent a pager terminal (located in an overlapping cell area) from receiving identical signals from many base sites and to reduce the error rate of the received data.

Historically, various methods for the simultaneous transmission of page data were employed. Presently, a popular method for providing the simultaneous transmission of page data utilizes a Global Positioning System ("GPS") receiver to synchronize the transmission of page data at an absolute time. The GPS is a satellite-based radio system which utilizes various satellites orbiting around the earth for determining or guiding the location of mobile bodies such as aircraft and ships. The GPS receiver method involves transmitting multiple full waves to a satellite and measuring the phase difference between the transmitted wave and a reflected wave from the satellite. The conventional method for page data transmission using the GPS receiver involves sending synchronized page data based on absolute time information from the high-speed paging system with high-speed paging protocol.

Generally, the paging system can be divided into a paging terminal which generates page data from information received from the subscriber and a base site which receives the page data from the paging terminal and transmits an on-air frequency to the applicable pager. The base site portion of the paging system can be further divided into (1) a transmitter control portion for combining the page data (received from the paging terminal) with the appropriate protocol, synchronizing the received page data in accordance with the absolute time information (i.e., reference clock signal) from the GPS receiver, and sending the received page data to a (2) transmitter portion, wherein the received page data is modulated to an on-air frequency and then transmitted to the applicable pager.

Since the method of synchronizing the transmission of page data is basic to a paging system using a high-speed paging protocol, the transmitter controller associated with each base site must determine, beforehand, the exact time at which the page data must be sent. This determination is made based on the received page data and frame information from the paging terminal. Then, at the determined time, the transmitter controller sends the page data to the transmitter, wherein the page data is modulated to on-air frequency and then transmitted. As demonstrated above, the transmitter controller is responsible for managing all the time information and for synchronizing and transmitting the page data to the transmitter.

There are several problems associated with the actual implementation of the conventional method for simultaneously transmitting page data as described above. First, since the configuration of the simultaneous transmission of page data is based on the setup of the paging terminal, only the transmitter controller considers the timing of the page data transmission (i.e, the transmitter cannot consider these aspects). In other words, even though the transmitter controller synchronizes the transmission of the page data based on the absolute time information, the transmitter can only frequency modulate and transmit the page data received from the transmitter controller. In addition, even if the transmitter controller sends the page data to the transmitter at the correct time (i.e., the determined time discussed above), there is no way to compensate for the time delay that may occur between the time the transmitter receives and modulates the page data and the time that such data is transmitted.

Referring to prior art FIG. 1, a timing diagram is shown for the transmission of page data from the transmitter controller and the transmission of the on-air page data from the transmitter in accordance with the reference clock signal, a 1PPS (Pulse Per Second) from the GPS. Specifically, FIG. 1(a) illustrates the 1PPS signal from the GPS. FIG. 1(b) illustrates a timing diagram for the transmission of page data from the transmitter controller to the transmitter, which is synchronized to the absolute time of n seconds. FIG. 1(c) illustrates a page data transmitting clock signal which is the reference that reads in the page data from the transmitter. FIG. 1(d) denotes the timing diagram for transmission of the received page data (which is modulated to on-air frequency) from the transmitter.

In FIG. 1(b), the transmitter controller is synchronized to the absolute time of n seconds whereby the page data, as well as the transmission clock signal, is sent to the transmitter. The transmitter receives the transmitted clock signal and reads in the page data in response to the rising edge of such clock signal. The transmitter then modulates the page data to an on-air frequency and transmits it.

As shown in FIG. 1, there is a time delay associated with the reading in of page data by the transmitter, which is called the Data Fetch Delay ("DFD"), as well as a time delay associated with the process of modulating the page data (which is read in) to an on-air frequency, which is called the Frequency Modulation Delay ("FMD"). Assuming that the sum of these two delay times is the total delay time (X) of the transmitter, it is clear from FIG. 1 that the actual time of transmission of the page data from the transmitter cannot be synchronized to the absolute time n. Specifically, the modulated page data is transmitted with the time delay X (i.e., the transmitter delay time) as compared to the absolute time n.

There are various differences in the delay times among the current commercially available transmitters. Even transmitters that are assembled by the same company have slight errors between them which causes the delay times for those transmitters to vary. As a result, during actual application, even when the paging service is offered by matching various transmitters, there are differences in the time of transmission of the final on-air transmission by each transmitter in the system, thereby preventing the simultaneous transmission of page data. Consequently, in actual application, when the page data is received, the error rate is increased due to the differences in transmission times from the transmitters having different delay times.

SUMMARY OF THE INVENTION

It is therefore an object of the invention to solve these problems by providing a circuit for delaying the reference clock signal (1PPS) produced by the GPS receiver, thereby controlling the time at which the page data is sent from the transmitter controller of the paging site to the transmitter so as to compensate for errors caused by the delay time associated with the transmitter.

It is another object of the invention to provide a method for synchronizing the page data (transmitted as on-air frequency) to the absolute time so as to achieve simultaneous transmission of such data.

In one aspect of the present invention, a circuit for delaying a reference clock signal from a Global Positioning System (GPS) receiver, comprises: a data bus; a latch block, connected to the data bus and responsive to a latch input signal, for receiving a signal from the data bus; a counter/controller block, connected to the data bus and responsive to a reference clock signal received from the GPS receiver (1PPS), for counting a series of pulses of a counter reference clock signal and generating a counter output signal in response thereto, whereby the counter/controller begins counting the pulses of the counter reference clock signal in response to the 1PPS signal; and a comparator, connected to the latch block and the counter/controller block, for receiving the data bus signal from the latch and for generating a delayed 1PPS signal (1PPS') in response to the data bus signal received from the latch block and the counter output signal from the counter/controller block.

In accordance with another aspect of the present invention a method for the simultaneous transmission of page data in a paging system having a plurality of transmitter controllers for receiving page data, and a transmitter associated with each of the transmitter controllers for modulating and transmitting the page data received from the corresponding transmitter controller, comprises the steps of: inputting a reference clock signal from a Global Positioning System (GPS) receiver into the plurality of transmitter controllers of the paging system; delaying, by a value of 1-X seconds, the reference clock signal from a Global Positioning System (GPS) receiver which is input into each of the transmitter controllers, the value of X being a delay time associated with the transmitter associated with each of the transmitter controllers; sending the page data from the plurality of transmitter controllers to each of the associated transmitters in accordance with the delayed clock signal; and transmitting the page data from the plurality of transmitters simultaneously, the simultaneous transmission of page data being synchronized with the reference clock signal from the GPS receiver.

These and other objects, features and advantages of the present invention will become apparent from the following detailed description of illustrative embodiments, which is to be read in connection with the accompanying drawings.

DETAILED DESCRIPTION OF PREFERRED EMBODIMENTS

Figure 5:
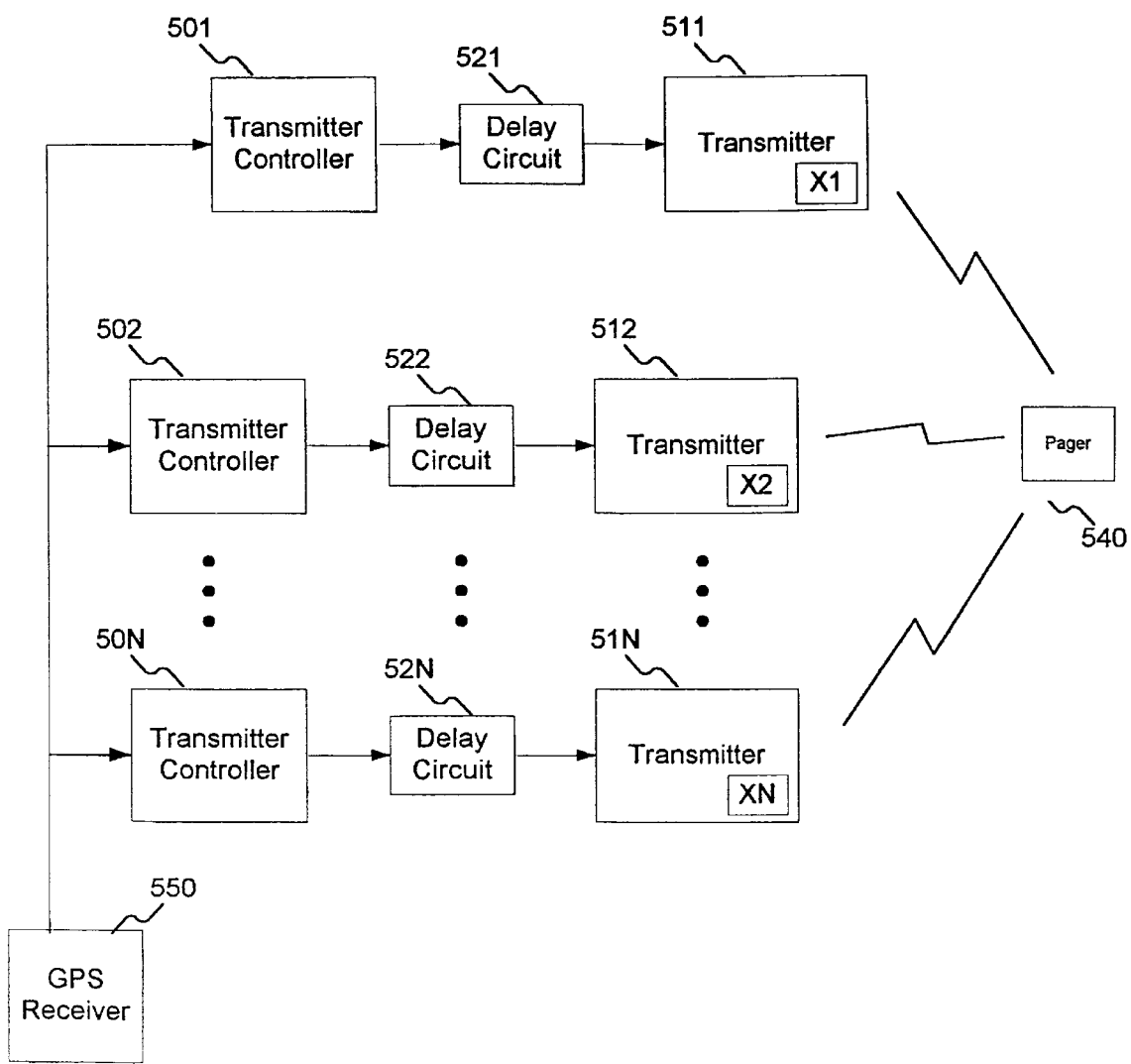
FIG. 5 is a block diagram illustrating a paging system with multiple transmitters, transmitter controllers, and associated delay circuits simultaneously paging a single pager in accordance with the present invention.

Turning now to drawings, FIG. 5 is a block diagram illustrating a paging system with multiple transmitter controllers 501–50N, transmitters 511–51N, and associated delay circuits 531–53N simultaneously paging a pager 540. Each transmitter controller 501–50N receives the page data from a paging terminal (not shown) and forward the page data to the transmitter 511–51N. Each transmitter controller 501–50N synchronizes an exact time at which to send the page data based on a reference clock signal received from a GPS receiver 550. Within each transmitter 511–51N the received page data is modulated to an on air frequency transmission to a pager 540.

While each paging controller 501–50N controls and synchronizes the forwarding of the page data to the corresponding transmitter 511–51N, the corresponding transmitter 511–51N performs the transmitting functions without compensating for inherent delays associated therein. Each transmitter 511–51N has a corresponding delay time X1–XN, which typically differs from the delay times of the other transmitters 511–51N.

Accordingly, compensation for the differing delays is by using corresponding delay circuits 521–52N to synchronize the transmission times of the page data among the plurality of transmitters 511–51N.

Figure 1:
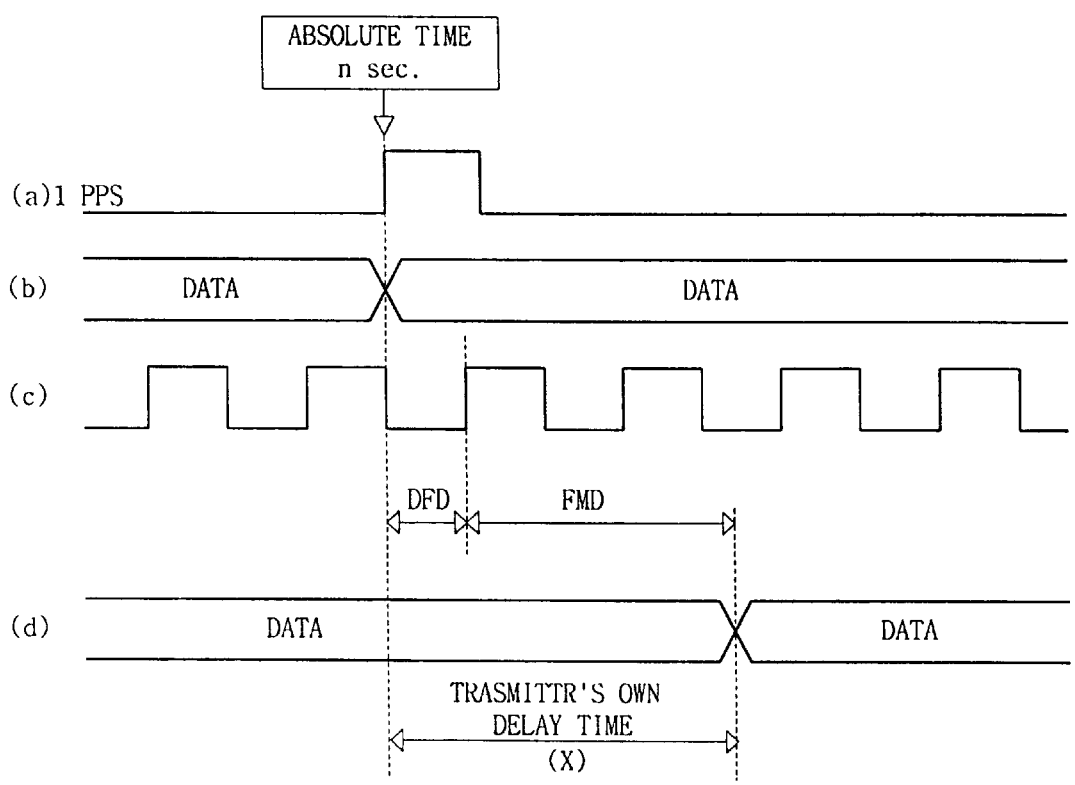
FIGS. 1(a)–(d) illustrate conventional timing diagrams for the transmission of page data from the transmitter controller to the transmitter and for the transmission of the modulated page data from the transmitter, as referenced to the 1PPS signal from the GPS.
Figure 2:
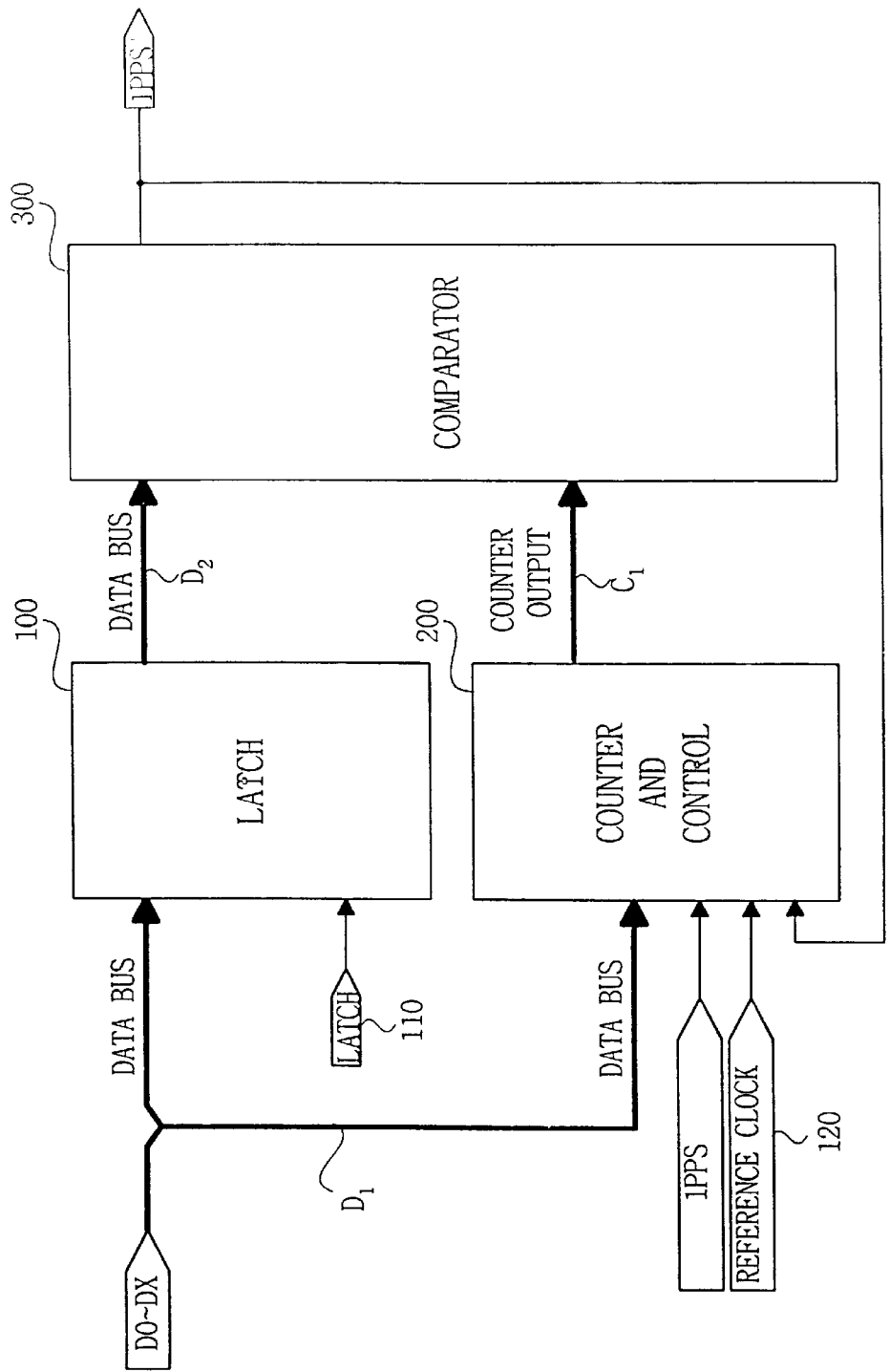
FIG. 2 illustrates a circuit block diagram for delaying the 1PPS reference clock signal to provide a delayed signal (1PPS') in accordance with the resent invention.

Referring to FIG. 2, a circuit block diagram illustrating a circuit block diagram for delaying the 1PPS reference clock signal to provide a delayed signal (1PPS') in accordance with the present invention. In FIG. 2, a first data bus (denoted as D1) is provided for inputting a desired time delay to a latch block (100) and to a counter/control block (200). When a latch input (110) is supplied, the latch block (100) sets the input time delay value in a comparator (300) via a second data bus (D2).

The operation of the circuit will now be described by way of example. Assume that the delay time X of a transmitter is 10 ms. The circuit is then configured to delay the 1PPS signal by 1 sec.−10 ms=990 ms so as to generate a delayed 1PPS signal ("1PPS"). In order to obtain this delay time, the counter reference clock (120) must be set at a frequency of 100 Hz so as to obtain clock pulses every 10 ms (i.e., a period of 10 ms). These pulses are input into the counter/control block (200) and counted. If these clock pulses are counted 99 times, the 1PPS signal can be delayed by 990 ms. Since, in the above example, the delay must be 990 ms in 10 ms steps, a delay value of 99 (HEXvalue 63) is input on the first data bus D1. It is to be understood that if a step smaller than 10 ms is required, a higher frequency reference clock may be used and the counter's unit may be increased.

Once the delay value has been set in the comparator 300, the counter/control block (200) begins counting the 10 ms reference clock pulses when it receives the first 1PPS signal from the GPS. The counter/controller (200) continuously outputs the counter values which are provided to the comparator (300) via the counter output line (denoted by C1). In the comparator (300), the desired time delay (which is received from the latch (100)) and the counter value (which is input from the counter/controller (200)) are continuously compared. If these two values are determined to be different, the counter/control block (200) continues counting and delaying the original 1PPS signal in 10 ms increments. When the counter output value (which is counted continuously from 1) coincides with the delay value set in the comparator (300) (which is 99 in the above example), the comparator (300) outputs a 1PPS' signal that is delayed by 990 ms (99 times in 10 ms steps) as compared to the 1PPS signal. The 1PPS' signal is then input in the counter/control block (200) to clear the counter. This process is repeated for every 1PPS signal pulse that is input in the counter/control block (200) so as to produce a 990 ms delayed 1PPS' signal.

As demonstrated above, the conventional method for sending page data from the transmitter controller to the transmitter is based on the absolute time information (i.e., the 1PPS signal) and does not consider the delay time of the transmitter. A method for compensating for the transmission delay time of the transmitter by optionally controlling the point of transmission of the page data in accordance with the present invention will now be described with reference to FIGS. 3 and 4. In accordance with the present invention, the reference time for sending the page data from the transmitter controller to the transmitter is determined by the 1PPS' signal which is generated by delaying the 1PPS signal from the GPS. If the 1PPS' signal is thought of as the time equal to absolute time plus 1 sec in the PPS signal, this is equivalent to generating a 1PPS signal at a time X in advance, where X is the transmitter delay time.

Figure 3:
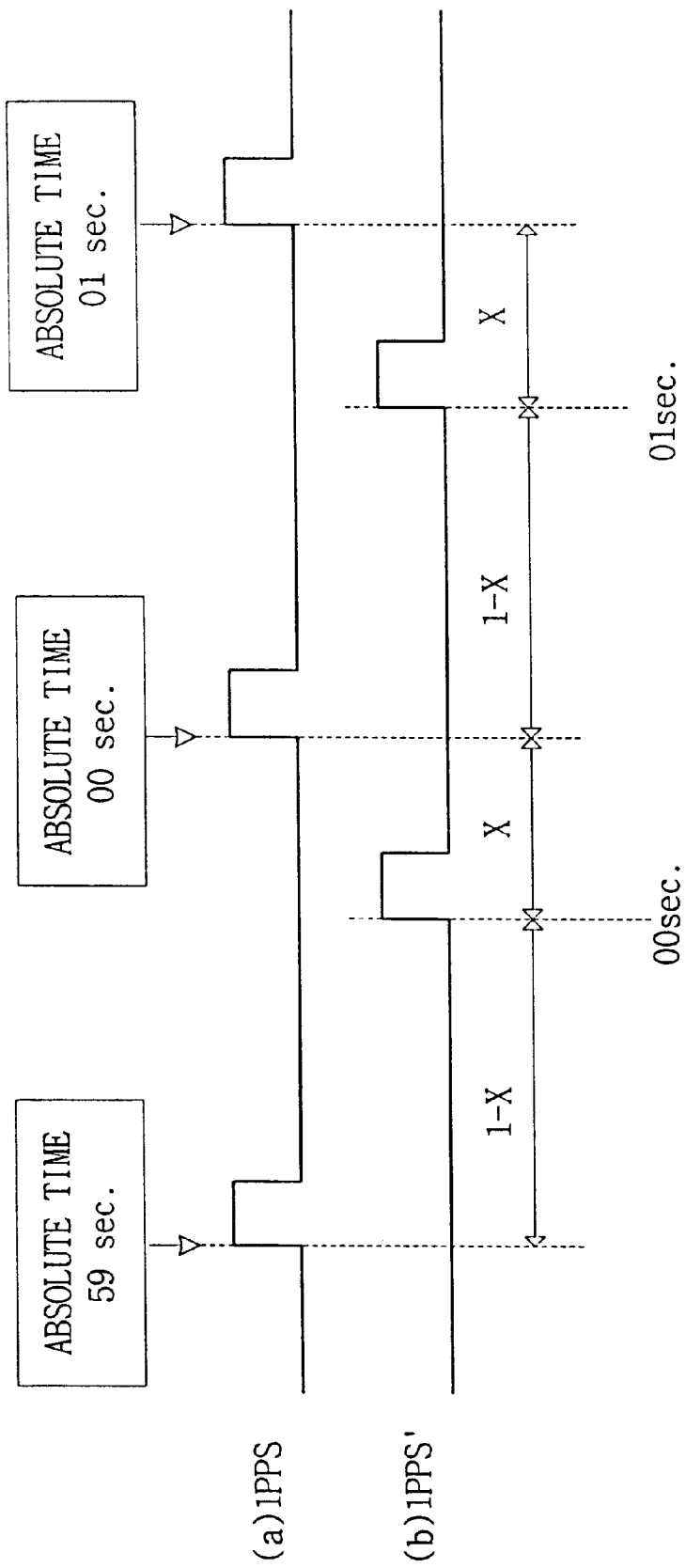
FIGS. 3(a) and (b) illustrate a timing diagram showing the correlation between the reference clock signal (1PPS) from the GPS and the corresponding delayed 1PPS' signal in accordance with the present invention.

Specifically, the timing diagram of FIG. 3 illustrates the 1PPS' signal is generated by delaying the 1PPS signal (as described above) by 1−X=990 ms (where X was assumed to be 10 ms). As shown in FIGS. 3(a) and (b), when the 1PPS signal is delayed by the time 1−X, the 1PPS' signal is essentially a signal which is advanced by time X in relation to the 1PPS signal when viewed in absolute time. As stated above, the 1PPS' signal (as opposed to the 1PPS signal) is the reference signal by which the transmitter controller sends page data to the transmitter. As such, the advanced time X compensates for the transmitter delay time X. Consequently, by applying this method, the final transmission point from the transmitter will be synchronized to the absolute time, notwithstanding the delay time of the transmitter.

For example, as shown if FIG. 3, after delaying the 1PPS signal (at the absolute time of 00 seconds) by any value, that delayed signal (i.e., 1PPS') is applied to the next absolute time of 01 second. Essentially, when matched to a transmitter with a delay time X, and after delaying the 1PPS signal (at 00 seconds) by 1−X, that delayed 1PPS' signal is applied to the absolute time of 01 second.

Figure 4:
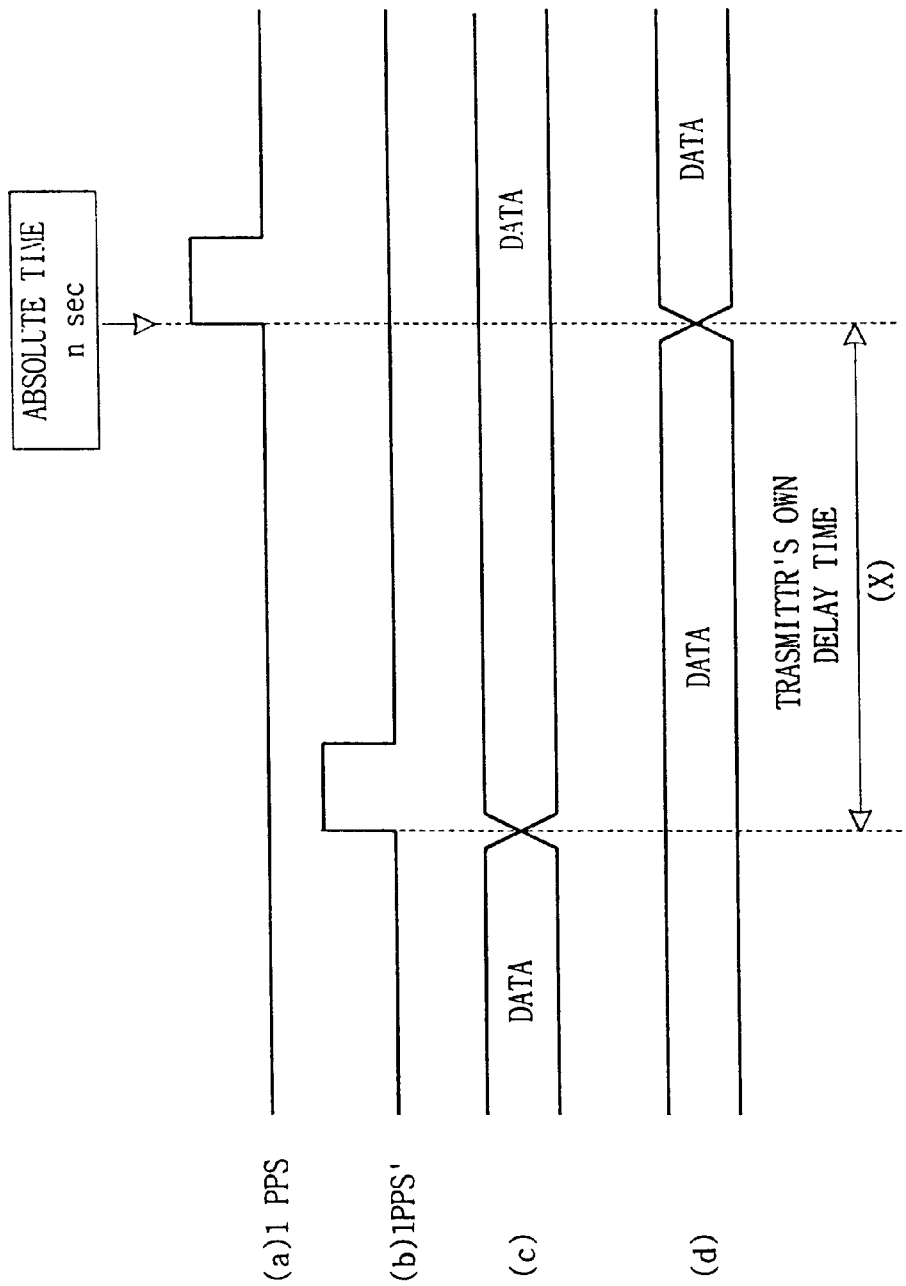
FIGS. 4(a)–(d) illustrate timing diagrams for a method for sending page data from the transmitter controller and transmitting modulated page data from the transmitter, as referenced to the reference clock signal 1PPS and the delayed signal 1PPS', in accordance with the present invention.

Referring now to FIG. 4, timing diagrams are shown for a method for sending page data from the transmitter controller and transmitting modulated page data from the transmitter, as referenced to the reference clock signal 1PPS and the delayed signal 1PPS', in accordance with the present invention. As explained above, and further shown in FIGS. 4(a) and (b), the 1PPS' signal is, essentially, a signal advanced by time X in absolute time. The timing diagrams in FIGS. 4(b) and 4(c) are illustrate that the transmission of data from the transmitter controller to the transmitter is synchronized to the 1PPS' signal in accordance with the present invention. Next, the timing diagrams of FIGS. 4(a) and 4(d) illustrate that the transmission of data (modulated to on-air frequency) from the transmitter is synchronized to the 1PPS signal in accordance with the present invention. In summary, the transmitter controller sends page data to the transmitter in accordance with the 1PPS' signal. The page data is then transmitted from the transmitter, in essence, at a delayed time X which is synchronized to the absolute time of n seconds (i.e., the 1PPS signal).

There are several advantages in employing the above-described method of the present invention in the paging system. First, since the point of transmission of the page data from the transmitter controller to the transmitter can be advanced (when viewed in absolute time), the point of transmission can be compensated regardless of the delay time of the transmitter. Specifically, the transmitter controller sends the page data to the transmitter at an advance time X (i.e., transmitter delay time) so that the time of transmission of the on-air frequency signal from the transmitter is synchronized to the absolute time (i.e., the 1PPS signal). Consequently, regardless of the delay time of the transmitter, all base sites can simultaneously transmit the page data (via their corresponding transmitters).

Moreover, even if various transmitters having different delay times associated therewith are matched and utilized in the paging system, the transmitter controller sends the page data at a time which is adjusted beforehand in accordance with each of the transmitter delay times, thereby offering the user a flexible system. This promotes ease of manufacture and development because the transmitter manufacturer is not required to optionally fix the delay time for each transmitter.

The simultaneous transmission method described above also minimizes the page data reception error rate, which can appear in overlapping cell areas. Furthermore, an effective system can be developed because each site can apply this concept of simultaneous data transmission to all systems.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. In a paging system having a plurality of transmitters each having a respective transmission delay, a plurality of delay compensation circuits each associated with a transmitter and each for individually compensating for the respective transmission delay of each transmitter to provide simultaneous transmission of page data among the plurality of transmitters by using a reference clock signal from a global positioning system (GPS) receiver, each delay compensation circuit comprising:

a data bus;
   a latch, connected to said data bus and responsive to a latch input signal, for receiving a signal from said data bus;
   a counter/controller, connected to said data bus and responsive to a reference clock signal received from said GPS receiver (1PPS), for counting a series of pulses of a counter reference clock signal and generating a counter output signal in response thereto, whereby said counter/controller begins counting said pulses of said counter reference clock signal in response to said 1PPS signal; and
   a comparator, connected to said latch and said counter/controller, for receiving said data bus signal from said latch and for generating a delayed 1PPS signal (1PPS') in response to said data bus signal received from said latch and said counter output signal from said counter/controller.

2. The circuit of claim 1, wherein said comparator outputs said 1PPS' signal when said counter output signal is equal to said data bus signal.

3. The circuit of claim 1, wherein said counter/controller is reset when said 1PPS' signal is output from said comparator.

4. The circuit of claim 1, wherein said data bus signal corresponds to the delay time of a transmitter in said paging system.

5. The circuit of claim 1, wherein said 1PPS' signal serves as a timing reference by a transmitter controller for sending page data to a transmitter associated with said transmitter controller in said paging system.

6. The circuit of claim 5, wherein the page data is transmitted from said transmitter, said transmission of page data being synchronized to said 1PPS signal.

7. In a paging system having a plurality of transmitter controllers for receiving page data, and a plurality of transmitters, each associated with a corresponding one of said transmitter controllers for modulating and transmitting said page data received from said corresponding transmitter controller, a method for the simultaneous transmission of page data, comprising the steps of:

receiving by said plurality of transmitter controllers, a reference clock signal from a Global Positioning System (GPS) receiver;

delaying, by a value of 1−X seconds, said reference clock signal which is received by each of said transmitter controllers, said value of X being a delay time associated with each of the transmitters corresponding to each of said transmitter controllers;

sending said page data from said plurality of transmitter controllers to each of said corresponding transmitters in accordance with said delayed reference clock signal; and transmitting said page data from said plurality of transmitters simultaneously, said simultaneous transmission of page data being synchronized with said reference clock signal from said GPS receiver.

8. A paging system for providing the simultaneous transmission of page data, comprising:

means for receiving a reference clock signal from a Global Positioning System (GPS) receiver by a plurality of transmitter controllers;

means, operatively connected to each of said transmitter controllers, for delaying, by a value of 1−X seconds, said reference clock signal;

means for sending said page data from said plurality of transmitter controllers to a plurality of transmitters, each corresponding to one of said plurality of transmitter controllers, in accordance with said delayed reference clock signal, said value of X representing the delay time of each of the transmitters; and means for simultaneously transmitting said page data from said plurality of transmitters, wherein said simultaneous transmission of page data is synchronized with said reference clock signal from said GPS receiver.

* * * * *